(12) United States Patent
Langer et al.

(10) Patent No.: US 8,624,743 B2
(45) Date of Patent: Jan. 7, 2014

(54) LONG DISTANCE PET COMMUNICATION SYSTEM WITH WIRELESS VOICE TRANSMITTER

(76) Inventors: Shirley Langer, Rolling Hills, CA (US); Richard Fujio, Cerritos, CA (US)

( * ) Notice: Subject to any disclaimer, the term of this patent is extended or adjusted under 35 U.S.C. 154(b) by 574 days.

(21) Appl. No.: 11/650,214

(22) Filed: Jan. 5, 2007

(65) Prior Publication Data

US 2007/0107673 A1    May 17, 2007

Related U.S. Application Data

(63) Continuation-in-part of application No. 10/852,771, filed on May 20, 2004, now abandoned.

(51) Int. Cl.
G08B 23/00    (2006.01)

(52) U.S. Cl.
USPC ............ 340/573.3; 340/573.1; 340/540; 455/567; 119/718; 379/88.12; 379/93.24

(58) Field of Classification Search
USPC ......... 340/573.3, 573.1, 540; 119/720, 721, 119/859, 908, 718, 905, 856; 379/88.12, 379/93.24; 455/500, 507, 567; 370/230.1, 370/466, 352, 356
See application file for complete search history.

(56) References Cited

U.S. PATENT DOCUMENTS

| | | |
|---|---|---|
| 3,336,530 A | 8/1967 | Sloan |
| 3,983,483 A | 9/1976 | Pando |
| 4,172,969 A | 10/1979 | Levine et al. |
| 4,745,882 A | 5/1988 | Yarnall, Sr. et al. |
| 4,967,696 A | 11/1990 | Tobias |
| 4,999,613 A * | 3/1991 | Williamson et al. ....... 340/573.4 |
| 5,207,179 A | 5/1993 | Arthur et al. |
| 5,337,041 A | 8/1994 | Friedman |
| 5,351,653 A | 10/1994 | Marischen et al. |
| 5,425,330 A | 6/1995 | Touchton et al. |
| 5,474,033 A | 12/1995 | Mitchell, Jr. |
| 5,483,924 A | 1/1996 | Whitaker |

(Continued)

FOREIGN PATENT DOCUMENTS

| | | |
|---|---|---|
| JP | 04084838 A | 2/2003 |
| WO | WO 03/015033 A1 | 3/1992 |

OTHER PUBLICATIONS

Finns launch mobile phone-based tracking system for hunting dogs, Abstract, Aug. 21, 2002, 1 page.

(Continued)

*Primary Examiner* — Hoi Lau
(74) *Attorney, Agent, or Firm* — Daniel Schein, Esq.

(57) ABSTRACT

The present invention is a system for communicating a voice signal or audio message initiated over potentially great distances and deliverable to an unattended animal, and comprises a base unit and a wireless receiver. Voice signals or e-mail messages incorporating embedded audio files or commands for delivering an audio message are sent over a global communication via computer network to the base unit which includes a transmitter. The transmitter sends via wireless communication the voice signal or an audio message from the transmitter to a local receiver secured to a pet collar or the like. The system transmits live audio signals (converted from the audio files or stored audio messages) in real time over great distances. The receiver is preferably worn on the pet and includes a speaker and wireless receiver for converting the wireless signals sent by the transmitter into audio signals emitted by the speakers.

4 Claims, 2 Drawing Sheets

(56) References Cited

U.S. PATENT DOCUMENTS

| | | | |
|---|---|---|---|
| 5,559,498 A * | 9/1996 | Westrick et al. ............ 340/573.3 |
| 5,565,850 A | 10/1996 | Yarnall, Jr. et al. |
| 5,610,588 A | 3/1997 | Yarnall, Jr. et al. |
| 5,632,232 A | 5/1997 | Waters |
| 5,648,999 A * | 7/1997 | Easterling et al. ......... 455/412.2 |
| 5,651,049 A | 7/1997 | Easterling et al. |
| 5,652,570 A | 7/1997 | Lepkofker |
| 5,749,324 A | 5/1998 | Moore |
| 5,808,551 A * | 9/1998 | Yarnall et al. .............. 340/573.4 |
| 5,815,077 A * | 9/1998 | Christiansen ............. 340/573.3 |
| 5,828,966 A | 10/1998 | Davis et al. |
| 5,844,489 A * | 12/1998 | Yarnall et al. .............. 340/573.3 |
| 5,884,168 A | 3/1999 | Kolev et al. |
| 5,936,530 A | 8/1999 | Meinhold |
| 5,955,953 A | 9/1999 | Hanson et al. |
| 5,956,630 A | 9/1999 | Mackey |
| 6,003,473 A | 12/1999 | Printz |
| 6,067,018 A * | 5/2000 | Skelton et al. ............. 340/573.3 |
| 6,313,733 B1 * | 11/2001 | Kyte ........................... 340/7.22 |
| 6,441,778 B1 | 8/2002 | Durst et al. |
| 6,474,269 B2 | 11/2002 | So |
| 6,487,992 B1 * | 12/2002 | Hollis .......................... 119/712 |
| 6,561,137 B2 * | 5/2003 | Oakman ...................... 119/721 |
| 6,591,786 B1 * | 7/2003 | Davis .......................... 119/719 |
| 6,720,879 B2 | 4/2004 | Edwards |
| 6,748,902 B1 | 6/2004 | Boesch et al. |
| 6,782,847 B1 * | 8/2004 | Shemesh et al. ............ 119/718 |
| 6,801,793 B1 * | 10/2004 | Aarnio et al. ................ 455/566 |
| 6,830,014 B1 * | 12/2004 | Lalor ........................... 119/859 |
| 6,860,240 B2 * | 3/2005 | Kim et al. .................... 119/719 |
| 7,042,361 B2 * | 5/2006 | Kazdin et al. .............. 340/573.4 |
| 7,287,009 B1 * | 10/2007 | Liebermann .................... 705/42 |
| 7,379,421 B1 * | 5/2008 | Gao et al. ................... 370/230.1 |
| 7,434,541 B2 * | 10/2008 | Kates ........................... 119/720 |
| 2001/0045898 A1 * | 11/2001 | Pelekis .................... 340/825.69 |
| 2002/0007798 A1 | 1/2002 | Paviak et al. |
| 2002/0015418 A1 * | 2/2002 | Uemura ........................ 370/466 |
| 2002/0036569 A1 | 3/2002 | Martin |
| 2002/0072395 A1 | 6/2002 | Miramontes |
| 2002/0172332 A1 | 11/2002 | Carroll et al. |
| 2003/0000478 A1 | 1/2003 | Lynch |
| 2003/0016658 A1 * | 1/2003 | Creamer et al. .............. 370/352 |
| 2003/0033214 A1 | 2/2003 | Mikkelsen et al. |
| 2003/0116099 A1 * | 6/2003 | Kim et al. ..................... 119/719 |
| 2003/0149527 A1 | 8/2003 | Sikila |
| 2004/0017296 A1 * | 1/2004 | Davis .......................... 340/573.3 |
| 2004/0189477 A1 * | 9/2004 | Hisano ....................... 340/573.3 |
| 2004/0194714 A1 | 10/2004 | Lee |
| 2004/0206310 A1 * | 10/2004 | Hutchins ....................... 119/720 |
| 2004/0252847 A1 | 12/2004 | Bassett |
| 2005/0059426 A1 * | 3/2005 | Aarnio et al. ............... 455/550.1 |
| 2005/0062588 A1 | 3/2005 | Spector |
| 2005/0073420 A1 * | 4/2005 | Kazdin et al. .............. 340/573.4 |
| 2005/0099291 A1 | 5/2005 | Landau |
| 2005/0153661 A1 * | 7/2005 | Beck ............................... 455/73 |
| 2005/0217606 A1 * | 10/2005 | Lee et al. ...................... 119/720 |
| 2005/0217607 A1 * | 10/2005 | Light et al. ................... 119/721 |
| 2005/0257752 A1 * | 11/2005 | Langer ......................... 119/712 |
| 2005/0284412 A1 * | 12/2005 | Kroll ............................ 119/719 |
| 2007/0056526 A1 * | 3/2007 | Gianladis et al. ............ 119/721 |
| 2007/0127632 A1 * | 6/2007 | Swingle et al. .............. 379/67.1 |
| 2007/0204803 A1 * | 9/2007 | Ramsay ....................... 119/720 |
| 2008/0056459 A1 * | 3/2008 | Vallier et al. ................ 379/88.12 |
| 2008/0282988 A1 * | 11/2008 | Bloksberg .................. 119/51.02 |

OTHER PUBLICATIONS

Give a dog a cell phone, CNN.com [retrieved from internet May 24, 2005] Feb. 10, 2005, 2 pages.

Physics with Modern Physics for Scientists and Engineers, Richard Wolfson et al, Harper Collins College Publishers, 1995, p. 839-840, 4 pages including title page and copyright page.

Dogs With Phone Numbers, by Arik Hesseldahl, www.Forbes.com, Ten O'clock Tech [retrieved from internet Oct. 12, 2005] Aug. 28, 2002, 4 pages.

Cell Phones Going to the Hunting Dogs, by Matt Huuhtanen, Associated Press, ESPN.go.com [retrieved from internet Oct. 12, 2005] Aug. 20, 2002, 2 pages.

\* cited by examiner

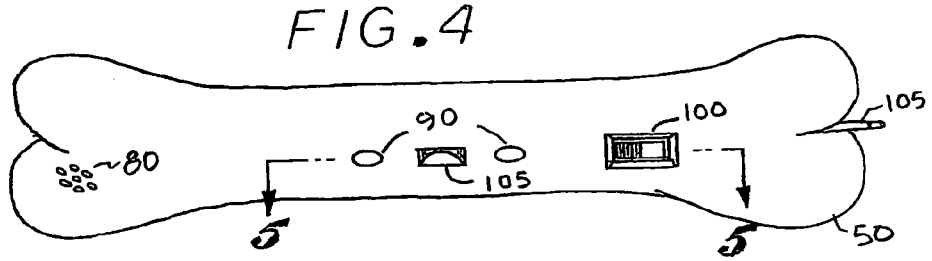
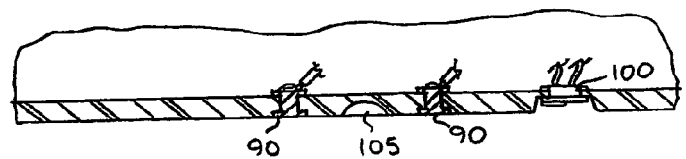
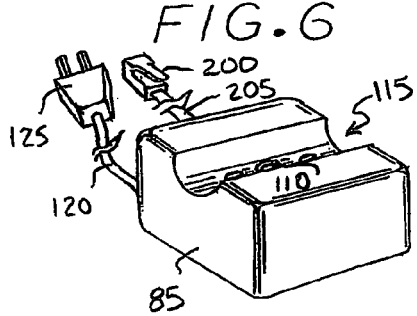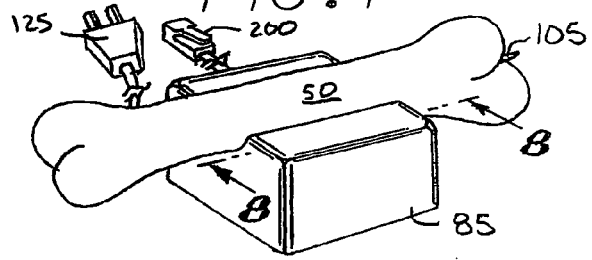
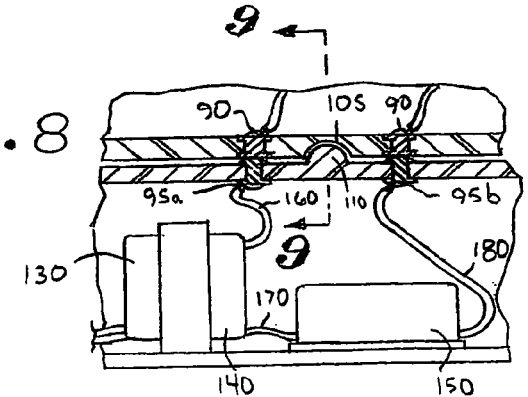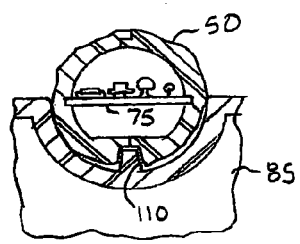

LONG DISTANCE PET COMMUNICATION SYSTEM WITH WIRELESS VOICE TRANSMITTER

CROSS-REFERENCES TO RELATED APPLICATIONS

This application is a continuation-in-part of U.S. patent application Ser. No. 10/852,771 filed May 20, 2004 now abandoned which is hereby incorporated by reference in its entirety.

FIELD OF THE INVENTION

The present invention is directed to a pet communication device, and more particularly to a system including a device carried on a pet collar or at a stationary location near an animal's resting place that receives wireless signals from a local transmitter and converts said wireless signals to an audio response, and where the audio response is derived from a live audio stream communicated to the local transmitter via a remote telephone, an email message, or from a set of pre-recorded messages.

BACKGROUND OF THE INVENTION

The bond between a pet and its owner can be among the strongest relationships in a person's life. Many pet owners report that they consider their pets to be part of the family, and as a result many pet owners take great care to tend to their pet's needs as well as their comfort. In 2003, it has been reported that pet owners will spend over 33 billion dollars on products that cater to pets in one form or another. Much attention in this market has been spent recently on upscale products that cater to affluent or indulgent pet owners who seek to pamper their pet with special conveniences and amenities, such as gourmet pet foods, pet apparel, and pet furniture. For some pet owners, nothing is too good for their pet.

One area of particular interest that has not been the subject of much attention, but which is present is virtually all of the instances of pet ownership, is the concern over a pet's isolation when the owner is away. Whether the separation is due to the owner working all day, traveling, vacationing, or merely that the owner is at one of many locations that does not permit the pet to accompany it, there may exist a strong desire on the owner's part to communicate with the pet. The owner is often concerned about the pet's isolation and the pet craves contact with its owner when left alone. Yet heretofore there is little in the way of technology that will allow a pet owner situated at a remote location to contact his or her pet and ensure that the pet will receive the message. The frustration in an absence of any reliable means for communicating to one's pet can be extreme to a pet owner.

While the need for remote communication with one's pet is largely ignored, there exists devices in the prior art to convey commands, particularly to corral or limit a pet's movement. For example, U.S. Pat. No. 4,967,696 to Tobias purports to disclose a dog collar with a receiver unit that can broadcast a tone or human message conducted at a local transmitter. In one embodiment, the receiver emits a tone that may be outside the audible range of humans but perceived by the canine, while in another embodiment the receiver includes an amplifier and speaker that emits a human voice. The Tobias device acts as a local, one-way walkie talkie that allows short range communication pet. Another hand-held RF transmitter and matched RF receiver on a dog collar is disclosed in U.S. Pat. No. 4,745,882 to Yamall, Sr. et al. Yamall's device is directed to a pet confinement system that emits either an electric shock or alarm if the animal attempts to exit a confinement zone, and signals a base station that the animal has approached the boundaries of the confinement area. In Arthur et al., U.S. Pat. No. 5,207,179, a pet confinement system is disclosed wherein the pet is outfitted with a collar that includes an RF receiver and a digital voice recorder that allows playback of pre-recorded audio messages. The playback is triggered by the proximity of the dog's collar, which includes an antenna, with a loop antenna placed around the boundary which broadcasts the RF signal encoded with a spoken command. As the animal approaches the confinement boundary, the receiver picks up the signals and broadcasts the decoded message as audible speech.

The foregoing disclose apparatus for extending communication between a pet and an owner in a local area, but lack the capacity to allow communication from distances beyond the limits of the receiver/transmitter range—typically on the order of one mile or less. Thus, the devices can be used for owners with large properties to communicate over short distances with animals that are allowed to explore and roam. However, there devices described above do not permit a pet owner at a remote location (work, vacation, etc.) to communicate with his or her pet, and the pet owner is left knowing that the beloved pet may be without human contact—or at least its owner's voice—for the duration of the owner's stay. This may cause the owner to be depressed over missing the animal and the separation may also manifest itself in the animal's behavior. Therefore, there is a need in the art for a device and system that allows a pet owner to communicate through long distances with his pet at any time, without additional human involvement or limitations on distance between the owner and the pet.

SUMMARY OF THE INVENTION

The present invention is a digital playback system controlled by telephone or other global network for communicating a real-time voice stream or pre-recorded audio messages initiated remotely and deliverable locally to an animal. The voice steam and/or command for delivering an audio message is sent over a telephone line or other global communication network to a local transmitter, which in turn sends via wireless communication electromagnetic signals corresponding to the voice stream, encoded audio message, or audio message stored in the transmitter to a local receiver secured to a pet collar or the like. The local receiver worn on the pet (preferably on the collar) or located near where a pet can be ordinarily be found (such as a resting place) includes a speaker and amplifier that converts radio signals back into an original voice stream or audio message, where the voice stream or audio message is played through the speaker to the animal. By using a telephone or other global network (such as the internet accessible via a web site) to initiate and relay the remote owner's message to the wireless transmitter, the present invention allows a pet owner to provide a verbal communication in the form of commands, greetings, or conversation to his pet even if the owner is in a different city or even a different country. The system can transmit live audio signals (converted from voice inputs) in real time over great distances, and can also be used by the remote owner to send pre-recorded messages to the pet using the telephone keypad to convey commands to the transmitter to transmit a selected message to the animal without further human interaction.

Further, the system can be programmed to send messages on a particular schedule or randomly throughout the day.

BRIEF DESCRIPTION OF THE DRAWINGS

FIG. 4 is an enlarged, front view of the receiver of FIG. 1;

FIG. 5 is a sectional, cross-sectional view taken along sectional lines 5-5 of the receiver of FIG. 4;

FIG. 6 is an elevated, perspective view of a recharging cradle for storing the receiver of FIG. 1;

FIG. 7 is an elevated, perspective view of the cradle of FIG. 6 storing the receiver of FIG. 1;

FIG. 8 is an enlarged, cross-sectional view of the mating of the receiver of FIG. 1 and the cradle of FIG. 6 along sectional lines 8-8 showing the connection of the recharging terminals; and FIG. 9 is an enlarged, cross-sectional view of the receiver of FIG. 1 and the cradle of FIG. 6 taken along sectional lines 9-9 of FIG. 8 showing the circuit board of the receiver and terminal connections between the receiver and the cradle.

DETAILED DESCRIPTION OF THE INVENTION

The present invention is directed to a system for communicating telephonically (or using other global networks such as the Internet) across potentially great distances with an animal where such communication requires no human interaction to relay the audio message to the animal except to place the telephone call itself or send an encoded audio message via e-mail. That is, a pet owner can communicate directly with its unattended pet when the pet owner is away from home. This allows the pet owner to take comfort in the fact that an unattended pet can hear its owner's voice during extended periods of separation and even across great distances. Previously, one's only hope of communicating with one's pet from a distance would be to turn up the volume on an ordinary answering machine, and then telephone the answering machine in the hope that the animal would happen to be within earshot of the answering machine during the call and hear the message broadcast through the answering machine. However, this technique had no guarantee that the animal would be within hearing range of the machine at the time of the message and no way of verifying that the animal actually receives the message. The present invention assures the pet owner that the message will be delivered to the animal where ever the animal is, as long as the animal is within the range of the wireless transmitter.

Figure 3:
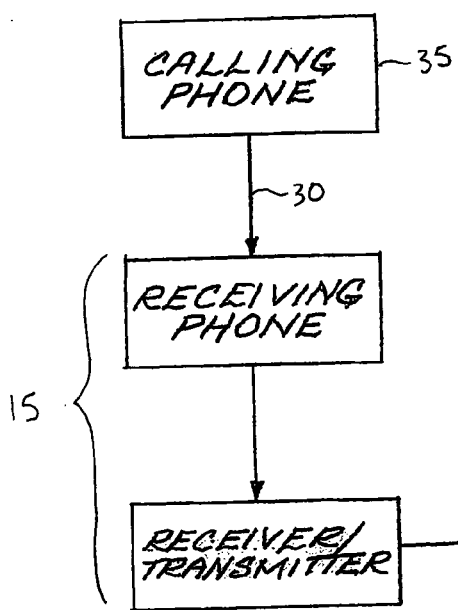
FIG. 3 is a schematic depiction of an embodiment of the present invention.

The present invention utilizes telephone answering device comprising a base unit including a wireless transmitter, and a separate small portable receiver communicating with the base unit's transmitter. Graphically, FIG. 3 depicts the base unit 15 incorporating a telephone call receiver/wireless transmitter combination, and a wireless receiver 20 in communication with the base unit. The wireless link between the base unit 15 and the wireless receiver 20 is graphically represented by reference arrow 25. The base unit 15 is connected to a standard telephone line that allows calls to be placed to the base unit 15 from anywhere in the world where telephone service is available. Reference arrow 30 graphically represents the connection between a pet owner's call-placing telephone 35 and the call-receiving base unit 15.

In a first embodiment, a telephonic connection may be established between the remote telephone 35 and the base unit 15, whereupon the base unit can be commanded via the telephone link to perform specified operations using a touch tone key pad on the telephone. On most telephones, depressing the key pad buttons emit specific tones that can be recognized by the base unit and used to send commands to the base unit. Thus, a tone or sequence of tones sent at the remote telephone 35 are received and translated by the base unit 15 into various commands corresponding to the operation of the invention. The base unit preferably includes a processor programmed to carry out the operations disclosed below, including recognition of touch tone telephone signals. By programming the base unit to recognize and respond to the tones in a designated manner, the base unit can be configured to automatically carry out operations without the need for human supervision. For example, a first command may be to initiate a communication link 25 with the portable receiver 20 which is carried by an animal 40. After the wireless link 25 is established between the base unit 15 and the portable receiver 20, audio signals can be relayed to the receiver that are converted by the receiver 20 into sound corresponding to either the originating telephone call or pre-recorded messages stored in the base unit.

Once the communication link 25 is established, voice signals originating at the remote telephone 35 may be communicated across the telephone line 30 to the base unit, and then relayed at the base unit 15 using the wireless transmitter to the portable receiver 20. That is, the wireless transmitter of the base unit 15 converts the voice signals received over the telephone line 30 into electromagnetic waves that are emitted wirelessly using an RF or other carrier wave throughout a local area determined by the range of the transmitter/receiver combination. At the portable receiver 20, the electromagnetic waves or pulses are acquired and converted into audio signals corresponding to the original voice signals of the caller at telephone 35. The audio signals are amplified and directed to a speaker where the voice signals are reproduced, allowing the person placing the call in a remote location to "talk" with the animal 40.

In one embodiment of the present invention, the base unit 15 includes a memory for storing one or more pre-recorded audio messages that can be remotely activated either by directly dialing the base unit or using a wireless paging system. For example, a message can be stored in the base unit 15 in the owner's voice that greets the animal in a familiar or accustomed manner and uses the animal's name. Another message can include a command to return to its dwelling or to go outside, or any other voice commands that the animal has been trained to obey. As one can surmise, various greetings, commands, and other communications can be stored in the memory of the base unit. Using the remote telephone 35, the pet owner can call or page the base unit 15 and, employing the touch pad on the remote telephone, instruct the base unit to communicate any of the stored messages to the animal 40. The transmitter of the base unit 15 recalls from the memory the selected message or command and wirelessly transmits the selected message to the receiver 20 in the manner described above. One benefit of this feature is that anyone can initiate the telephone call, so that a neighbor or friend of the pet owner can cause the machine to communicate the pet owner's voice to the animal 40 if the pet owner is indisposed or unable to place a telephone call. Another benefit of the feature is that the recorded message will be familiar to the animal after several repetitions, and that the animal will recognize the voice and be comforted by it. In another embodiment, the system can be record an audio message over the telephone for future playback, where the recorded message can be incorporated into the library of pre-recorded messages available to send to the animal.

Figure 1:
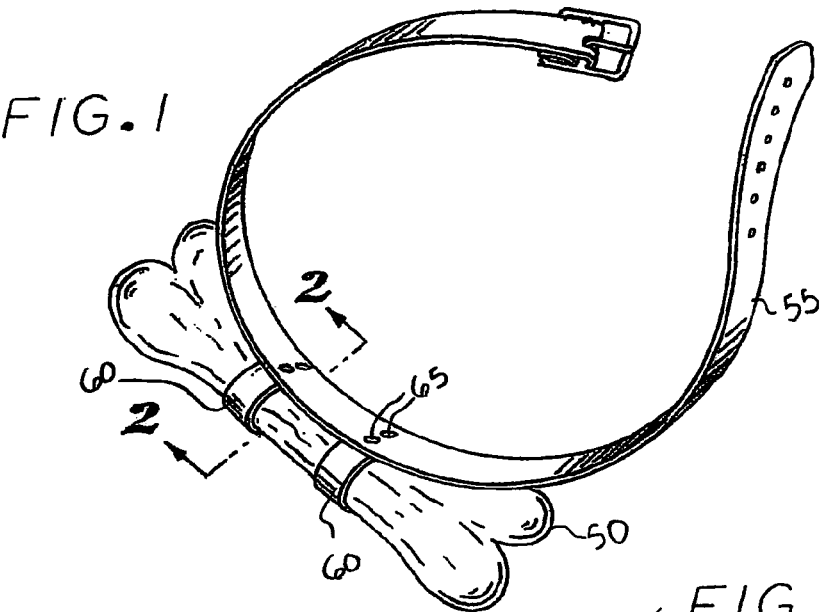
FIG. 1 is an elevated, perspective view of a first embodiment of the receiver component of the present invention secured to a canine collar.
Figure 2:
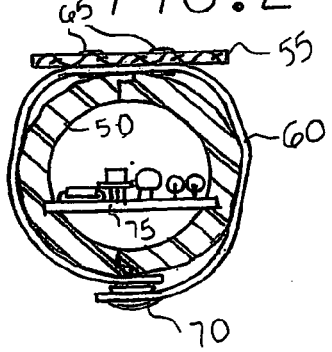
FIG. 2 is a cross-sectional view of the receiver of FIG. 1 along sectional line 2-2.

The receiver 20 is preferably carried on a pet or domestic animal using a standard animal collar 55 or similar attachment that ensures the receiver cannot be dislodged or removed by the animal. One embodiment of the receiver is shown in FIG. 1 in which the receiver is encased in a decorative but protective housing 50 in the shape of a dog bone. Of course, other shapes are possible such as a fetching stick or, in the case of a house cat, a "mouse." The housing 50 is made of a durable, light weight plastic material that is easily formed into a hollow tubular structure that shields the electronics of the receiver 20 from shock, moisture, and contaminants. The housing 50 may includes apertures 80 adjacent a speaker (not shown) to facilitate the broadcast of sound from the speaker within the housing. As FIG. 2 illustrates, within the hollow structure is a circuit board 75 incorporating the electronics of the receiver and amplifier. Other components of the receiver include a band-pass filter, an audio amplifier, a battery, and a speaker. The band-pass filter and audio amplifier are typically combined in a conventional superheterdyne receiver. The band pass filter is connected via coaxial cable to a stub antenna 105 and is tuned to the frequency of the transmitter. The audio amplifier amplifies the attenuated, filtered transmitter signal in order to drive the speaker, which emits a sound of the individual's voice.

Securing the receiver to the animal can take many forms. In FIGS. 1 and 2, two bands 60 encircle the dog bone shaped housing to secure the receiver to the animal, where the bands 60 are riveted, snapped, or otherwise fastened to the collar 55 using fasteners 65 at a middle portion, and each end portion includes a complimentary snap fastener 70 or other releasable fastening mechanism such as Velcro® or buckles. The receiver could also be incorporated into the collar itself as a single unit, or the receiver could be located on the animal using another form such as a type of headgear or neckwear.

In one embodiment of the present invention the receiver 20 is powered by a rechargeable battery that can be recharged using a designated cradle 85 shown in FIG. 6. The cradle 85 may be a separate unit from the base unit 15, or the base unit 15 may be combine with the cradle 85 in a single unit. In this case, the cradle 85 will include a phone jack 200 and connecting cable 205 in addition to the other electrical connections described below. The cradle 85 includes a channel 115 sized to seat the receiver 15, and an electrical cord 120 and plug 125 to connect to a standard electrical outlet. The cradle 85 includes a voltage transformer 130 for converting the 120 volt alternating current to a much lower voltage, such as for example three volts. Then a rectifier 140 is used to convert the alternating current to a direct current which can be used to recharge the cell. One lead 160 from the rectifier is directed to a first terminal 95a while a second lead 170 leads to a voltage inverter 150. A third lead 180 connects the voltage inverter 15 to the second terminal 95b, where the polarity of the two terminals are opposite due to the voltage inverter. To enable the recharging operation, the housing 50 is equipped with a pair of exposed electric connectors 90 that connect directly to the positive and negative terminals of the rechargeable battery (not shown). An on/off switch 100 allows the receiver 20 to switch from active to inactive mode to allow the power in the rechargeable battery to be preserved. The cradle 85 includes complimentary terminals 95 that align with the leads 90 of the receiver to transfer power to the rechargeable battery. To accomplish the recharging operation, the receiver 15 enclosed in the housing 50 is placed in the cradle 85 such that the electrical connectors 90 of the rechargeable battery are aligned with the terminals 95a,b of the cradle. To aid in the alignment, the housing 50 of the receiver 20 may be equipped with a recess or slot 105 (see FIG. 5) that receives a complimentary tab 110 on the cradle 85 positioned to properly align the leads 90 with the terminals 95 (FIG. 8). When the tab 110 is positioned in the slot 105, an electrical connection is established between the cradle's terminals 95a,b and the electrical connections 90 leading to the rechargeable battery. As is known in the art, the conversion of electrical energy into stored chemical energy will recharge the batter of the receiver and thus the receiver can be used indefinitely with intermittent recharging.

The operation of the invention may be utilized in the following manner. A pet owner sets the receiver 20 with its housing 50 in the cradle 85 such that the tab 110 is seated in the slot 105 and an electrical connection is established between the terminals of the cradle and the electrical connectors of the rechargeable battery in the receiver. With the electric plug of the cradle engaged in an electrical outlet, the alternating current of the standard electrical outlet is converted to a direct current which is used to replenish the power of the rechargeable battery. After a period of time, the receiver's battery will be fully charged and ready for operation. A typical charge would be expected to last approximately one week, although alternate batteries can provide longer service. The fully charged receiver 15 is removed from the cradle 85 and connected to the animal 40 at the collar 55 using the provided bands. When the pet owner leaves the pet, the receiver is turned on using the on/off switch to allow the receiver to receive radio waves from the base unit and the unoccupied pet carries the receiver at all times to permit communication without further human interaction. Should the pet owner leave the home and desire to communicate with the animal, the pet owner places a telephone call from a remote telephone 35 to the base unit 15 establishing a telephone line connection 30. Alternatively, the base unit could be connected to an Internet accessible computer such that voice or instructions can be carried over the internet from the remote location to the base unit.

Once the telephone (or alternate network) connection is established, the pet owner enters into the telephone keypad a series of numbers that are pre-established by the programming of the base unit to initiate contact with the receiver on the animal. If the pet owner's live voice is to be delivered, the pet owner begins speaking into the handset of the telephone to communicate the audio speech across the telephone line to the base unit. The audio from the pet owner is then converted into wireless signals by the transmitter and broadcast using radio waves in an area governed by the strength of the transmitter—preferably on the order of one mile. As long as the animal is within the specified range, the receiver will pick up the radio broadcast radio waves at the antenna and the waves are filtered and used to drive an amplifier. The amplifier drives a speaker to reproduce the pet owners voice in real time, without any human interaction aside from the placing of the call by the pet owner. The foregoing assures the pet owner that communication with the animal is assured at any time, provided the receiver is on and charged. When the message is complete, the system may include other tone commands to terminate the connection and place the system back to its original stand-by state.

In one embodiment of the present invention, the receiver includes a paging unit that is actuated at the base unit in case the receiver should become inadvertently dislodged from the animal. In this case, a signal sent by the base unit via the transmitter is interpreted by the receiver as requesting that an audio alarm on the receiver be activated. Using beeps or other alarm sounds, the receiver continuously or intermittently sends out the alarm signal facilitating the discovery of the lost receiver. The alarm may be deactivated once the receiver is located using either a switch on the base unit or the receiver itself. Another possible feature of the present invention is a ring tone on the base unit that simulates a barking sound or other related animal sound. When the base unit receives an incoming telephone call, the ring of the base unit is barking or meowing to distinguish the call from other calls unrelated to the operation or as an amusement.

In another alternative embodiment of the invention, the base unit can be connected to a computer in order to used to pass audio messages to their pet using a standard e-mail process. In this embodiment, the base station is connected to a typical personal computer via a USB port cable or similar interface. The personal computer may be running a Windows compatible application that installs on a standard personal computer. The software has two primary purposes:

1. Recording System: Allows the user to record messages and save in an audio format file for later playback to the transmitter. Each audio file may be assigned a "token code". The software preferably allows the user to create new and delete existing audio files from their computer using the e-mail account by simply creating and deleting e-mail messages. The audio format may be created using a standard computer microphone, and stored in a standard audio format (e.g., .wav file) that permits storage and playback of an audio file; and 2. Message Relaying: A POP3 or similar e-mail client which collects e-mails destined for a specific address, e.g. sparky@,mydomain.com. The system can also use a MAPI or similar interface to an existing POP3 mail client (such as Microsoft Outlook) that retrieves e-mails carrying encoded audio messages to be delivered to the pet receiver, e.g. sparky@mydomain.com. The software preferably constitutes a background polling system that continuously monitors and processes specific e-mails. If an e-mail is found for the specific address, the software performs the following steps:

1. The software checks to see if there is an audio attachment (e.g., a .wav file) embedded in or attached to the e-mail, and extracts any such audio file. The software then plays the audio stream of the wav file, which is picked-up by the BASE STATION via the connection to the personal computer or simply by the proximity of the computer speaker(s) to the base station. The audio stream is then relayed (in real time) to the receiver on the pet's collar, where it can be heard by the animal. In this fashion, a user can send any recorded audio message directly to their pet's receiver from around the globe within a few minutes at any hour of the day and without any other human interaction. All that is required is that the user to have the ability to record a message at their location, and attach the audio file to the e-mail.

2. Alternatively, the software also checks to see if the e-mail has a "token code" embedded in the textual portion of the e-mail (which correlates to one of the pre-recorded messages in process 1, above). If the corresponding "token code" is detected, the application plays the audio stream of the pre-recorded message to the base station via the connection to the personal computer or by virtue of the proximity of the base station to the computer speaker. The prerecorded audio message is then relayed (in real time) to the speaker on the pet's collar to be heard by the pet as previously described. This method allows the user to send a pre-recorded message to their pet without the need for anything other than general e-mail access.

3. The system flags the messages as 'played' and cycles polling so that old e-mails are not replayed and new messages are detected and played as received.

The foregoing description of one or more embodiments of the present invention is not intended to be exhaustive, but rather exemplary. It will be understood that the embodiments described herein should not be construed as limiting the scope of the invention, and those skilled in the art may make many variations and modifications without departing from the spirit and scope of the invention. All such variations and modifications are intended to be within the scope of the invention as defined in the appended claims.

We claim:

1. A method for communicating audio information from a pet owner at a remote location to a pet comprising:
    mounting a wireless receiver and speaker on the pet for receiving electronic signals containing audio information and converting said electronic signals into audio signals;
    providing a base station having a wireless transmitter of sufficient capability to communicate to transmit said electronic signals to said wireless receiver on said pet, said base station further in communication with a personal computer;
    equipping said personal computer with software that allows a user to record messages and save said recorded messages in an audio format for later playback by the base station;
    preparing, by said pet owner, an e-mail with an audio attachment at a remote location and sending said e-mail with an audio attachment to an email account designated for relaying audio messages to said pet;
    collecting e-mails corresponding to said e-mail account designated for relaying audio messages to said pet and extracting said audio attachment from said e-mail received in said e-mail account; and
    communicating said audio extracted from said e-mail to said base station, whereupon said base station wirelessly transmits said audio messages to said pet via said wireless receiver.

2. The method of claim 1 further including:
    assigning a token code to said recorded messages;
    associating the recorded messages having a token code with the e-mail;
    checking to see if said e-mail includes any token code: and
    communicating said recorded message associated with said token code and stored on said personal computer to said base station for transmittal to said wireless receiver on said pet if said token code is found in said e-mail.

3. The method of claim 1 wherein said base station can receive incoming telephone calls and relay audio information received via said telephone call and transmit said audio information to said pet via said wireless receiver.

4. A method for communicating audio information from a remote location to a pet comprising:
    mounting a wireless receiver and speaker on the pet for receiving electronic signals containing audio information and converting said electronic signals into audio signals;
    providing a base station having a wireless transmitter of sufficient capability to communicate to transmit said electronic signals to said wireless receiver on said pet, said base station further in communication with a personal computer;
    assigning a token code to said recorded messages;
    associating the recorded messages having a token code with e-mails;

equipping said personal computer with software that allows a user to record messages and save said recorded messages in an audio format for later playback by the base station;

preparing by said pet owner, an e-mail with a token code at a remote location and sending said e-mail with a token code to an email account designated for relaying audio messages to said pet;

collecting e-mails corresponding to said e-mail account designated for relaying audio messages to said pet;

checking to see if said e-mails include said token code:

communicating said recorded messages associated with said token code and stored on said personal computer to said base station for transmittal to said wireless receiver on said pet; and communicating said recorded message to said base station, whereupon said base station wirelessly transmits said recorded message to said pet via said wireless receiver.

* * * * *